US012183264B2

(12) United States Patent
Won et al.

(10) Patent No.: US 12,183,264 B2
(45) **Date of Patent: *Dec. 31, 2024**

(54) DISPLAY APPARATUS AND METHOD OF DRIVING THE SAME

(71) Applicant: Samsung Display Co., Ltd., Yongin-si (KR)

(72) Inventors: Hyeonuk Won, Suwon-si (KR); Dohyun Kang, Hwaseong-si (KR); Jungkook Park, Cheonan-si (KR); Donghak Pyo, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/203,926

(22) Filed: May 31, 2023

(65) Prior Publication Data

US 2023/0326401 A1 Oct. 12, 2023

Related U.S. Application Data

(63) Continuation of application No. 17/684,695, filed on Mar. 2, 2022, now Pat. No. 11,688,335.

(30) Foreign Application Priority Data

May 4, 2021 (KR) ........................ 10-2021-0057772

(51) Int. Cl.
*G09G 3/32* (2016.01)

(52) U.S. Cl.
CPC ....... *G09G 3/32* (2013.01); *G09G 2310/0243* (2013.01); *G09G 2310/027* (2013.01); *G09G 2320/0285* (2013.01); *G09G 2358/00* (2013.01)

(58) Field of Classification Search
CPC ............. G09G 3/32; G09G 2310/0243; G09G 2310/027; G09G 2320/0285; G09G 2358/00
See application file for complete search history.

(56) References Cited

U.S. PATENT DOCUMENTS

| | | | | |
|---|---|---|---|---|
| 11,688,335 | B2 * | 6/2023 | Won | G09G 3/3233 345/690 |
| 2011/0234605 | A1 | 9/2011 | Smith et al. | |
| 2017/0284418 | A1 | 10/2017 | Hanby et al. | |
| 2018/0005567 | A1 * | 1/2018 | Takahashi | G09G 3/36 |
| 2018/0033384 | A1 | 2/2018 | Kim et al. | |
| 2018/0308414 | A1 | 10/2018 | Kang et al. | |
| 2021/0027686 | A1 | 1/2021 | Roh et al. | |

FOREIGN PATENT DOCUMENTS

| | | | |
|---|---|---|---|
| KR | 100864882 | B1 | 10/2008 |
| KR | 101861795 | B1 | 5/2018 |
| KR | 1020180047275 | A | 5/2018 |
| KR | 1020190017501 | A | 2/2019 |
| KR | 1020200128289 | A | 11/2020 |

* cited by examiner

*Primary Examiner* — Andrew Sasinowski
(74) *Attorney, Agent, or Firm* — CANTOR COLBURN LLP

(57) ABSTRACT

A display apparatus is disclosed. The display apparatus includes a display panel including first pixels and second pixels, and a display panel driver which drives the display panel. In a first mode, the display panel driver drives both the first pixels and the second pixels. In a second mode, the display panel driver drives the second pixels in a first part for one frame, and drives the first pixels in a second part for the one frame.

20 Claims, 11 Drawing Sheets

VGREF:VGREF1,VGREF2,VGREF3,VGREF4

130:130a,130b,130c

DISPLAY APPARATUS AND METHOD OF DRIVING THE SAME

This application is a continuation of U.S. patent application Ser. No. 17/684,695, filed on Mar. 2, 2022, which claims priority to Korean Patent Application No. 10-2021-0057772, filed on May 4, 2021, and all the benefits accruing therefrom under 35 U.S.C. § 119, the content of which in its entirety is herein incorporated by reference.

BACKGROUND

1. Field

Embodiments of the invention relate to a display apparatus and a method of driving the display apparatus. More particularly, embodiments of the invention relate to a display apparatus that operates in a private mode in which a user looking at the display apparatus from a side may not perceive a normal image.

2. Description of the Related Art

In general, a display apparatus includes a display panel and a display panel driver. The display panel typically includes a plurality of gate lines, a plurality of data lines, and a plurality of pixels. The display panel driver typically includes a gate driver for providing a gate voltage to the plurality of gate lines, a data driver for providing a data voltage to the plurality of data lines, and a driving controller for controlling the gate driver and the data driver.

SUMMARY

In general, since a light emitted from pixels of a display apparatus may be directed not only to a front but also to a side, not only a user looking at the display apparatus from the front but also another user looking at the display apparatus from the side may perceive a normal image. Accordingly, when personal information is displayed on the display apparatus, the personal information may be undesirably exposed.

Embodiments of the invention provide a display apparatus and a method of driving the display apparatus for allowing only a user looking at the display apparatus from a front to perceive a normal image by using private pixels that block light directed to a side.

Embodiments of the invention also provide the display apparatus and the method of driving the display apparatus for minimizing a difference in deterioration degree between pixels by driving not only the private pixels but also a normal pixels in a private mode.

In an embodiment of a display apparatus according to the invention, the display apparatus includes a display panel including first pixels and second pixels and a display panel driver which drives the display panel. In such an embodiment, in a first mode, the display panel driver drives both the first pixels and the second pixels. In such an embodiment, in a second mode, the display panel driver drives the second pixels in a first part for one frame, and drives the first pixels in a second part for the one frame.

In an embodiment, the first part for the one frame may correspond to N−1 pixel rows of N pixel row, where N is an integer greater than 1. In such an embodiment, the second part for the one frame may correspond to a remaining pixel row of the N pixel rows.

In an embodiment, the first mode may be a normal mode in which a user looking at the display apparatus from a side perceives a normal image. In such an embodiment, the second mode may be a private mode in which the user looking at the display apparatus from the side does not perceive the normal image.

In an embodiment, the first pixels may be normal pixels, and the second pixels may be private pixels.

In an embodiment, each of the private pixels may include a plurality of sub-pixels. In such an embodiment, each of the plurality of sub-pixels may include a plurality of light emitting regions. In such an embodiment, a black matrix may be disposed between the light emitting regions of each of the plurality of sub-pixels.

In an embodiment, the display panel driver may include a gate driver which provides gate voltages to the display panel, a gamma reference voltage generator which generates a first gamma reference voltage, a second gamma reference voltage, a third gamma reference voltage, and a fourth gamma reference voltage, a data driver which provides data voltages to the first pixels based on the first gamma reference voltage in the first mode, provides the data voltages to the second pixels based on the second gamma reference voltage in the first mode, provides the data voltages to the first pixels based on the third gamma reference voltage in the second mode, and provides the data voltages to the second pixels based on the fourth gamma reference voltage in the second mode, and a driver controller which controls the gate driver, the gamma reference voltage generator, and the data driver.

In an embodiment, the gamma reference voltage generator may include a first gamma lookup table corresponding to the first gamma reference voltage for the first pixels in the first mode, a second gamma lookup table corresponding to the second gamma reference voltage for the second pixels in the first mode, a third gamma lookup table corresponding to the third gamma reference voltage for the first pixels in the second mode, and a fourth gamma lookup table corresponding to the fourth gamma reference voltage for the second pixels in the second mode.

In embodiments of a display apparatus according to the invention, the display apparatus includes a display panel including first pixels and second pixels and a display panel driver which drives the display panel. In such an embodiment, in a first mode, the display panel driver drives both the first pixels and the second pixels. In such an embodiment, in a second mode, the display panel driver drives the second pixels in a first time, and drives the first pixels in a second time after the first time.

In an embodiment, the first time for driving the second pixels and the second time for driving the first pixels may be repeated alternately with each other in the second mode.

In an embodiment, the second time may be shorter than the first time.

In an embodiment, the second time may be shorter than a time during which a user perceives an image displayed by the first pixels.

In an embodiment, the first pixels may be normal pixels, and the second pixels may be private pixels.

In an embodiment, each of the private pixels may include a plurality of sub-pixels. In such an embodiment, each of the plurality of sub-pixels may include a plurality of light emitting regions. In such an embodiment, a black matrix may be disposed between the light emitting regions of each of the plurality of sub-pixels.

In an embodiment, the display panel driver may include a gate driver which provides gate voltages to the display panel, a gamma reference voltage generator which generates a first gamma reference voltage, a second gamma reference voltage, a third gamma reference voltage, and a fourth gamma reference voltage, a data driver which provides data voltages to the first pixels based on the first gamma reference voltage in the first mode, provides the data voltages to the second pixels based on the second gamma reference voltage in the first mode, provides the data voltages to the first pixels based on the third gamma reference voltage in the second mode, and provides the data voltages to the second pixels based on the fourth gamma reference voltage in the second mode, and a driver controller which controls the gate driver, the gamma reference voltage generator, and the data driver.

In an embodiment, the gamma reference voltage generator may include a first gamma lookup table corresponding to the first gamma reference voltage for the first pixels in the first mode, a second gamma lookup table corresponding to the second gamma reference voltage for the second pixels in the first mode, a third gamma lookup table corresponding to the third gamma reference voltage for the first pixels in the second mode, and a fourth gamma lookup table corresponding to the fourth gamma reference voltage for the second pixels in the second mode.

In embodiments of a method of driving a display apparatus according to the invention, the method includes driving first pixels and second pixels in a first mode, and in a second mode, driving the second pixels in a first part for one frame, and driving the first pixels in a second part for the one frame.

In an embodiment, the first part for the one frame may correspond to N−1 pixel rows of N pixel rows, where N is an integer greater than 1. In such an embodiment, the second part for the one frame may correspond to a remaining pixel row of the N pixel rows.

In an embodiment, the first pixels may be normal pixels, and the second pixels may be private pixels.

In an embodiment, each of the private pixels may include a plurality of sub-pixels. In an embodiment, each of the plurality of sub-pixels may include a plurality of light emitting regions. In such an embodiment, a black matrix may be disposed between the light emitting regions of each of the plurality of sub-pixels.

In an embodiment, the method may further include setting a first gamma reference voltage for the first pixels using a first gamma lookup table in the first mode, setting a second gamma reference voltage for the second pixels using a second gamma lookup table in the first mode, setting a third gamma reference voltage for the first pixels using a third gamma lookup table in the second mode, and setting a fourth gamma reference voltage for the second pixels using a fourth gamma lookup table in the second mode.

In embodiments of the display apparatus and the method of driving the display apparatus, both first pixels and second pixels are driven in a first mode, the second pixels are driven in a first time (or a first part for one frame) of a second mode, the first pixels are driven in a second time (or a second part for the one frame) of the second mode after the first time of the second mode. Accordingly, personal information may be effectively protected in the second mode, a difference in deterioration degree between the first pixels and the second pixels may be substantially reduced, and color bleeding and afterimages may be substantially reduced.

BRIEF DESCRIPTION OF THE DRAWINGS

The above and other features of the invention will become more apparent by describing in detailed embodiments thereof with reference to the accompanying drawings, in which.

DETAILED DESCRIPTION OF THE INVENTION

Figure 1:
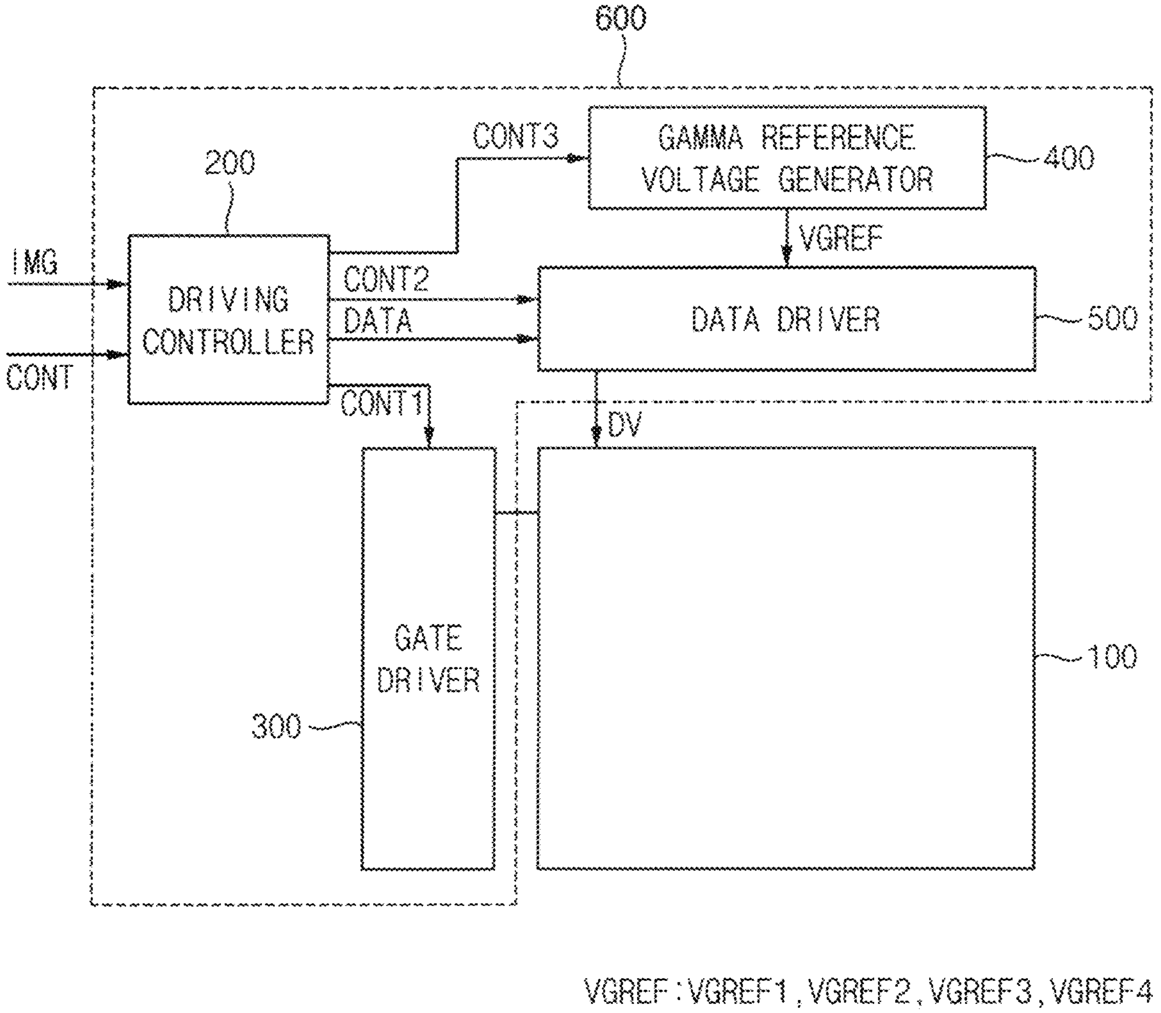
FIG. 1 is a block diagram illustrating a display apparatus according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first "element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or."

As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

FIG. 1 is a block diagram illustrating a display apparatus according to embodiments of the invention.

Referring to FIG. 1, an embodiment of the display apparatus may include a display panel 100 and a display panel driver 600. The display panel driver 600 may include a driving controller 200, a gate driver 300, a gamma reference voltage generator 400, and a data driver 500.

In one embodiment, for example, the driving controller 200 and the data driver 500 may be integrally formed with each other as a single unit (e.g., a single module or chip). In one embodiment, for example, the driving controller 200, the gamma reference voltage generator 400, and the data driver 500 may be integrally formed with each other as a single unit. A driving module in which at least the driving controller 200 and the data driver 500 are integrally formed may be referred to as a timing controller embedded data ("TED") driver.

The display panel 100 includes a display region for displaying an image and a peripheral region adjacent to the display region.

The display panel 100 may include a plurality gate lines, a plurality data lines, and a plurality of pixels electrically connected to the gate lines and the data lines.

The driving controller 200 may receive an input image data IMG and an input control signal CONT from an external apparatus (not illustrated). In one embodiment, for example, the input image data IMG may include red image data, green image data and blue image data. In such an embodiment, the input image data IMG may further include white image data. In an alternative embodiment, the input image data IMG may include magenta image data, yellow image data and cyan image data. The input control signal CONT may include a master clock signal and a data enable signal. The input control signal CONT may further include a vertical synchronizing signal and a horizontal synchronizing signal.

The driving controller 200 may generate a first control signal CONT1, a second control signal CONT2, a third control signal CONT3, and a data signal DATA based on the input image data IMG and the input control signal CONT.

The driving controller 200 may generate the first control signal CONT1 for controlling an operation of the gate driver 300 based on the input control signal CONT, and outputs the first control signal CONT1 to the gate driver 300. The first control signal CONT1 may include a vertical start signal, and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT. The driving controller 200 may output the third control signal CONT3 to the gamma reference voltage generator 400.

The gate driver 300 may generate a gate voltage driving the gate lines in response to the first control signal CONT1 received from the driving controller 200. The gate driver 300 may output the gate voltage to the gate lines. In one embodiment, for example, the gate driver 300 may sequentially output the gate voltage to the gate lines. In an embodiment, the gate driver 300 may be implemented as a gate integrated circuit, and the gate integrated circuit may be mounted on the peripheral part of the display panel 100. In an alternative embodiment, the gate driver 300 may be integrated or formed on the peripheral part of the display panel 100.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may be a desired data voltage DV in at least one reference gray scale.

In an embodiment of the invention, the gamma reference voltage generator 400 may be placed (disposed or provided) in the driving controller 200 or in the data driver 500.

The data driver 500 may receive the second control signal CONT2 and the data signal DATA from the driving controller 200 and receive the gamma reference voltage VGREF from the gamma reference voltage generator 400. The data driver 500 may convert the data signal DATA into a data voltage DV having an analog type. The data driver 500 may output the data voltage DV to the data lines.

Figure 2:
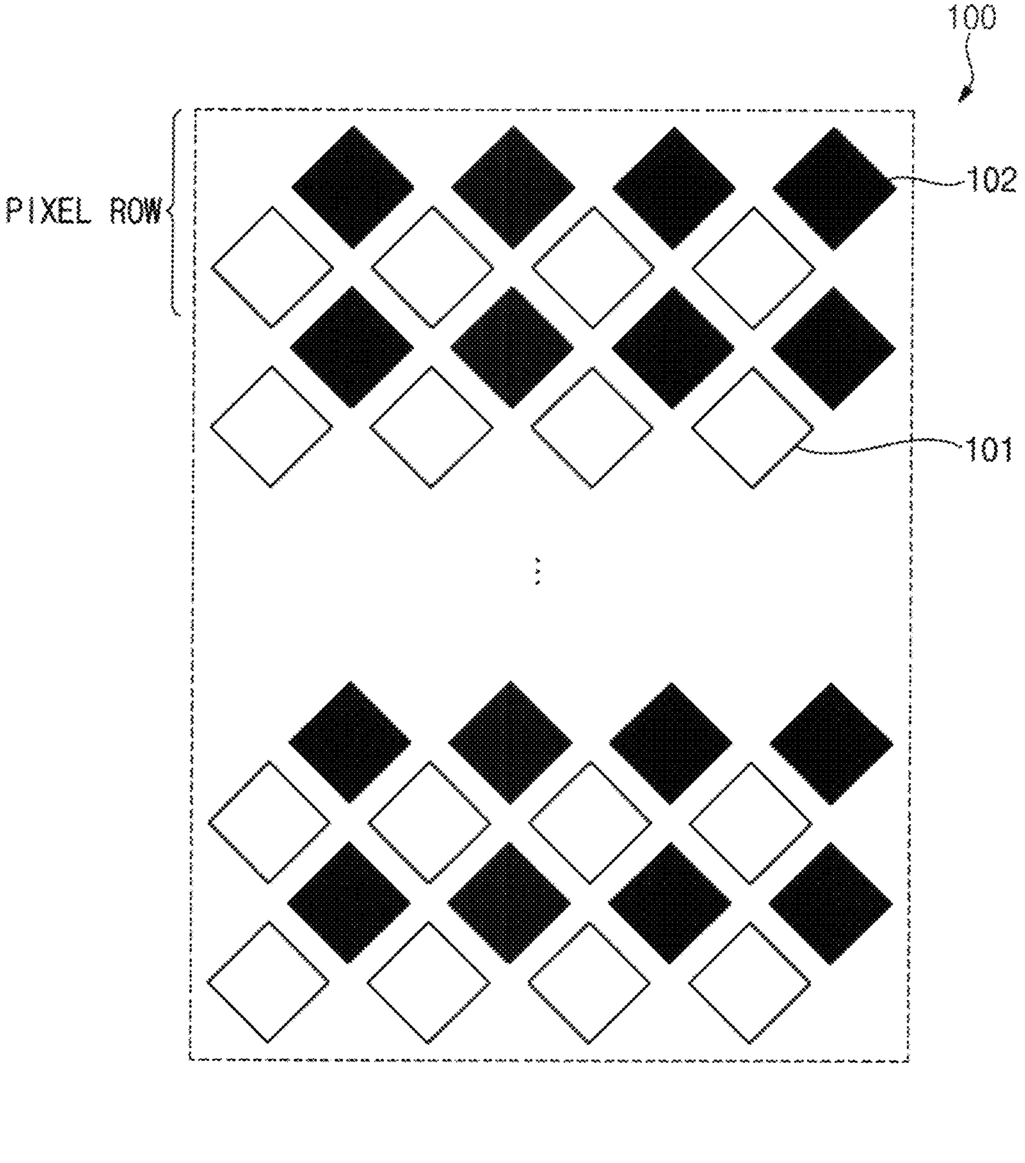
FIG. 2 is a diagram illustrating an embodiment of a display panel including first pixels and second pixels.

FIG. 2 is a diagram illustrating an embodiment of a display panel 100 including first pixels 101 and second pixels 102.

Referring to the FIG. 2, an embodiment of the display panel 100 may include the first pixels 101 and the second pixels 102. The display panel 100 may have a structure in which the first pixels 101 are surrounded by the second pixels 102, and the second pixels 102 are surrounded by the first pixels 101. Such a structure may be repeatedly arranged in the display panel 100.

Figure 3:
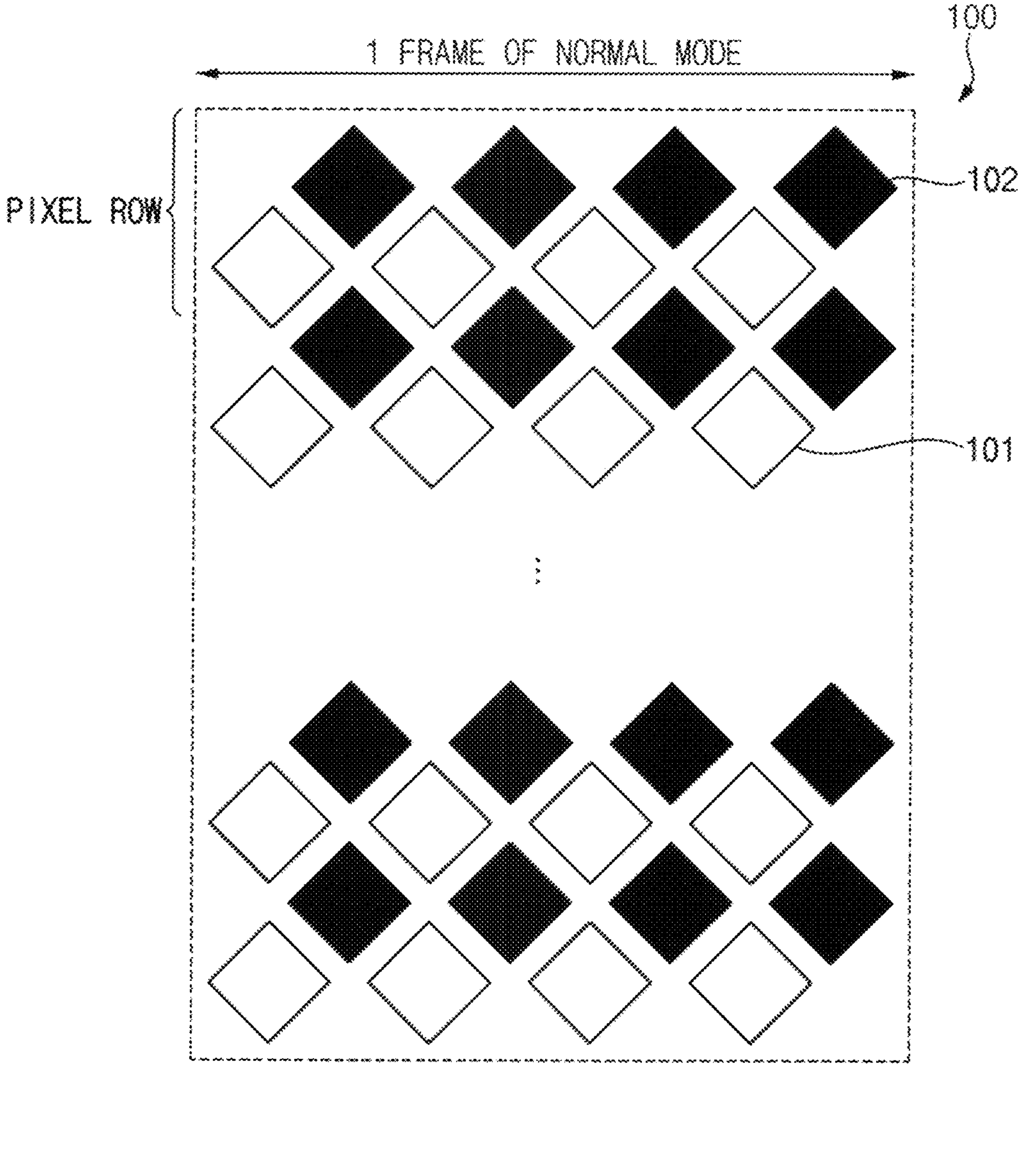
FIG. 3 is a diagram illustrating an embodiment in which first pixels and second pixels are driven in a first mode.

FIG. 3 is a diagram illustrating an embodiment in which the first pixels 101 and the second pixels 102 are driven in a first mode.

Referring to the FIG. 3, the display panel driver 600, in a first mode, may drive both the first pixels 101 and the second pixels 102.

Figure 4:
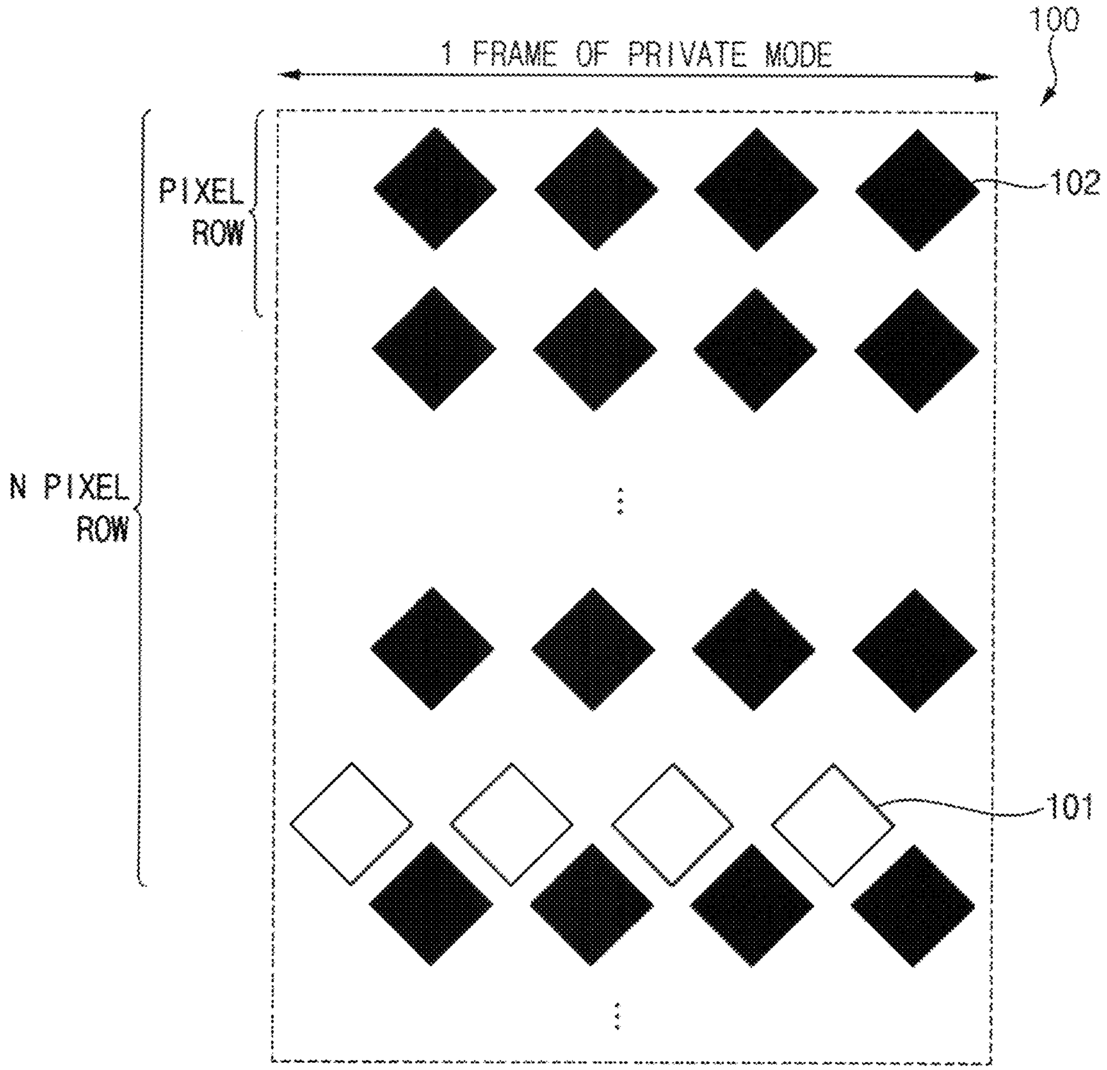
FIG. 4 is a diagram illustrating an embodiment in which first pixels and second pixels are driven in a second mode.

FIG. 4 is a diagram illustrating an embodiment in which the first pixels 101 and the second pixels 102 are driven in a second mode.

Referring to the FIG. 4, the display panel driver 600, in a second mode, may drive the second pixels 102 in a first part for one frame, and drive the first pixels 101 in a second part for the one frame. The second part may be smaller than the first part. Accordingly, in the second mode, the second pixel 102 may be driven more than the first pixel 101.

The first part for the one frame may correspond to N−1 pixel rows of every N pixel rows. In the display panel 100, the N pixel rows may be repeatedly arranged in a column direction. The second part for the one frame may correspond to a remaining pixel row of the N pixel rows. The remaining pixel rows may be any of the N pixel rows. In the second mode, the N−1 pixel rows may be driven by second pixels 102, and the remaining pixel row may be driven by the first pixels 101. As N increases, the user may not recognize the remaining pixel row driven by the first pixels 101. A lifetime of the second pixels 102 may be substantially improved compared to when all the second pixels 102 are driven in all the N pixel rows. Since there is a part in which the first pixels 101 are driven in the second mode, a difference in the deterioration degree between the first pixels 101 and the second pixels 102 may be substantially reduced.

Figure 5:
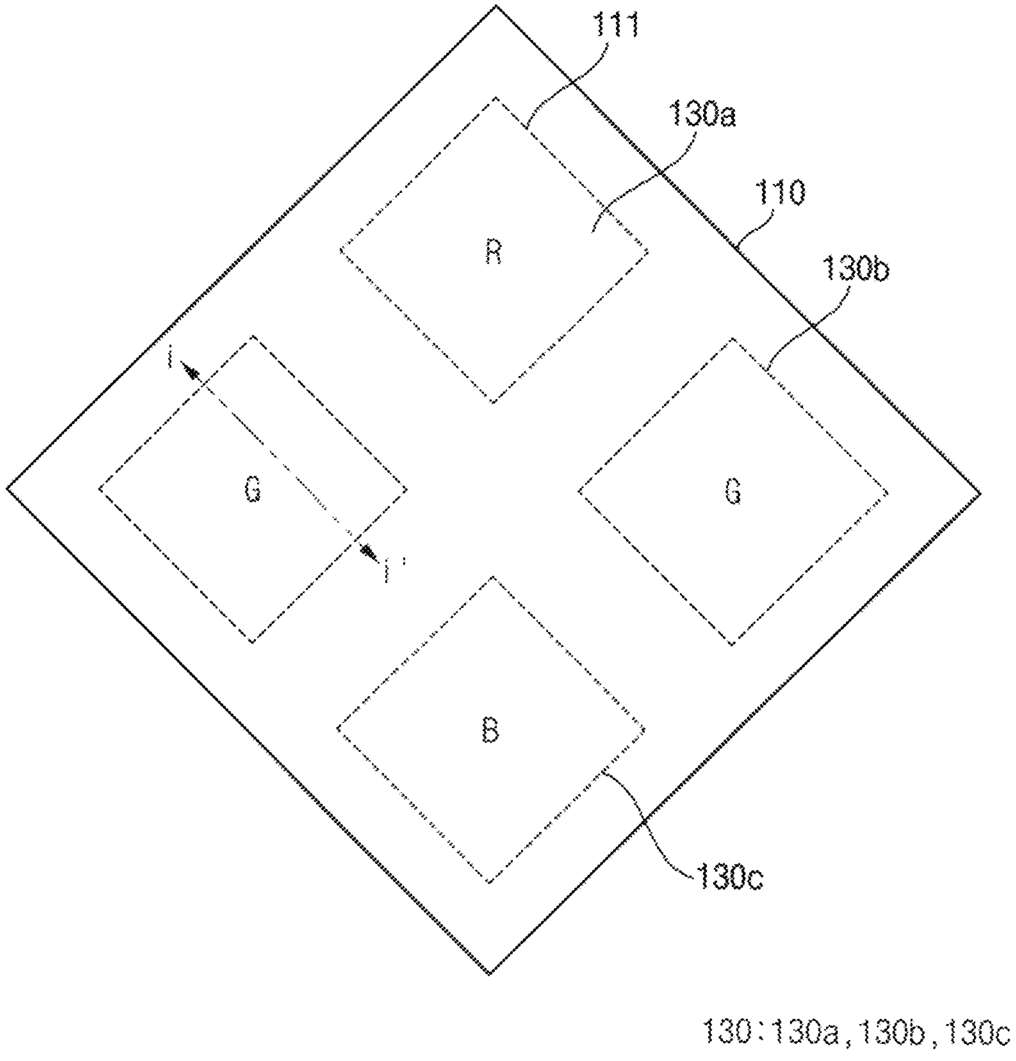
FIG. 5 is a diagram illustrating a structure of a normal pixel according to an embodiment of the invention.

FIG. 5 is a diagram illustrating a structure of a normal pixel 110 according to an embodiment of the invention.

Referring to the FIG. 5, the normal pixel 110 may include a plurality of sub-pixels 111. The sub-pixels 111 of the normal pixel 110 may include a light emitting region 130. The sub-pixels 111 of the normal pixel 110 may include a plurality of the light emitting regions 130. The light emitting region 130 may include a red (R) light emitting region 130*a*, a green (G) light emitting region 130*b*, and a blue (B) light emitting region 130*c*. In the normal pixel 110, a black matrix may be placed on the edge of (or to cover boundaries between) the sub-pixels 111 of the normal pixel 110.

Figure 6:
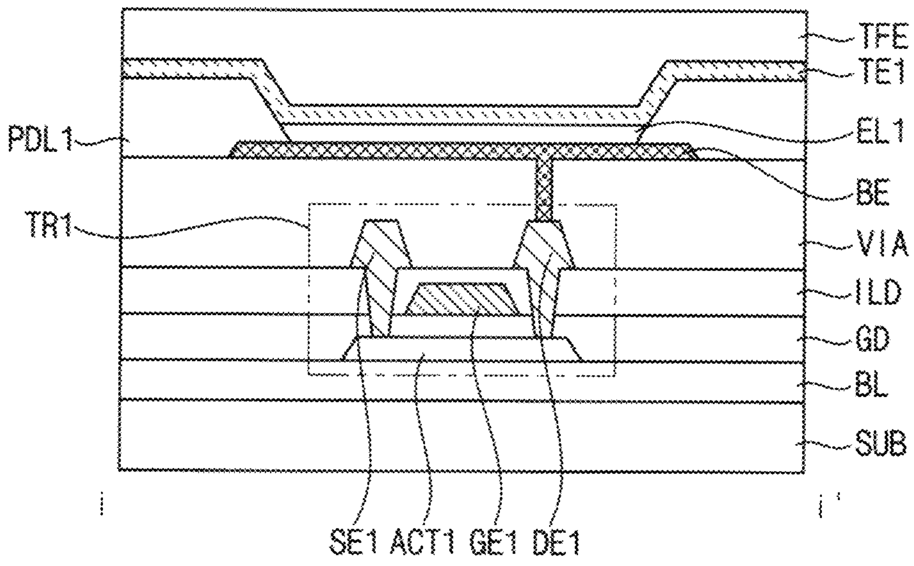
FIG. 6 is a sectional view of a sub-pixel of a normal pixel taken along line i-i' of FIG. 5 according to an embodiment of the invention.

FIG. 6 is a sectional view of a sub-pixel 111 of the normal pixel 110 taken along line i-i' of the FIG. 5 according to an embodiment of the invention.

Referring to the FIG. 6, an embodiment of the display panel 100 may include a substrate SUB, a buffer layer BL, a gate insulating layer GD, an interlayer insulating layer ILD, a first transistor TR1, a via layer VIA, a first pixel defining layer PDL1, a lower electrode BE, a first emission layer ELL a first upper electrode TE1, an encapsulation layer TFE, and the like. The first transistor TR1 may include a first active layer ACT1, a first gate electrode GE1, a first source electrode SE1, and a first drain electrode DE1. The sectional view of a position of the green light emitting region 130*b* may be the same as a sectional views of a position of each of the red light emitting region 130*a* and the blue light emitting region 130*c*.

Figure 7:
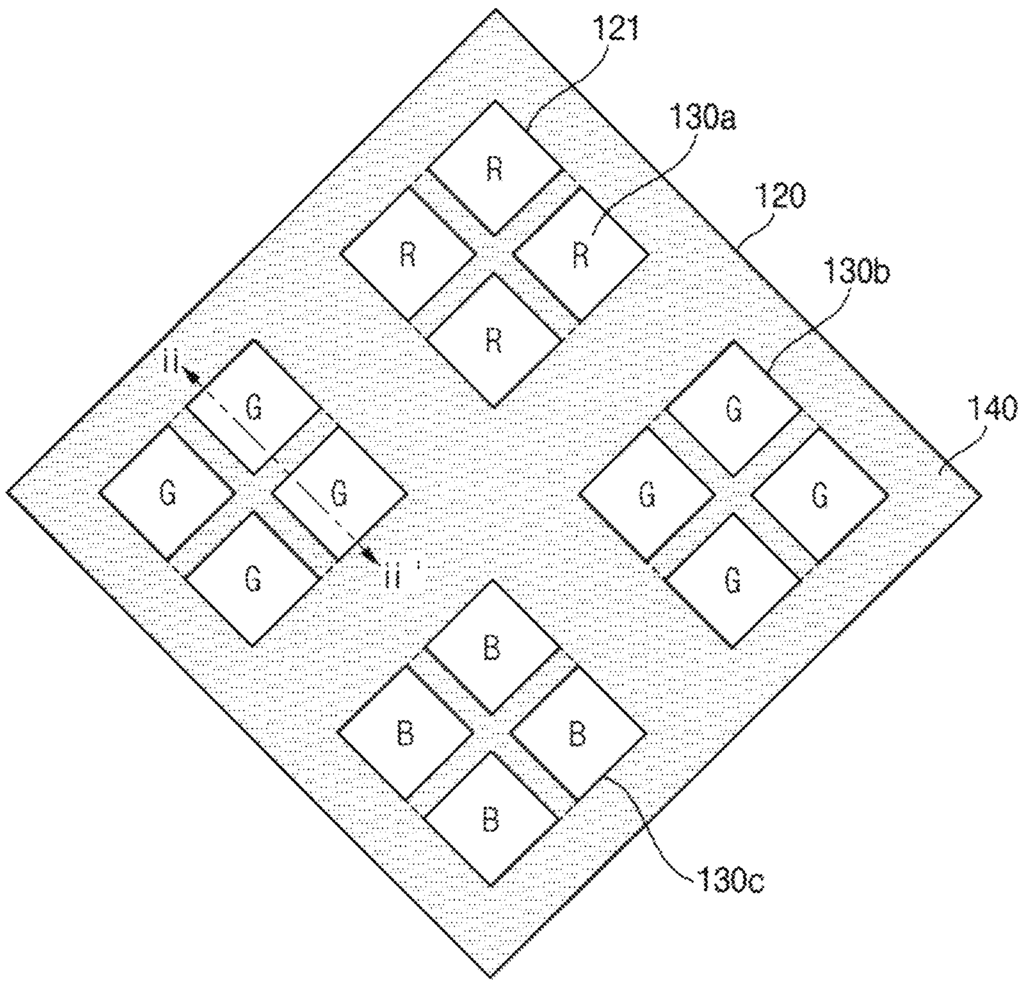
FIG. 7 is a diagram illustrating a structure of a private pixel according to an embodiment of the invention.

FIG. 7 is a diagram illustrating an embodiment in which a structure of a private pixel 120 according to an embodiment of the invention.

Referring to the FIG. 7, each of the private pixels 120 may include a plurality of sub-pixels 121. Each of the plurality of sub-pixels 121 may include a plurality of light emitting regions 130. The black matrix 140 may be placed (or disposed) between the light emitting regions 130 of each of the plurality of sub-pixels 121. The light emitting regions 130 may include a red (R) light emitting region 130*a*, a green (G) light emitting region 130*b*, and blue (B) light emitting region 130*c*.

Figure 8:
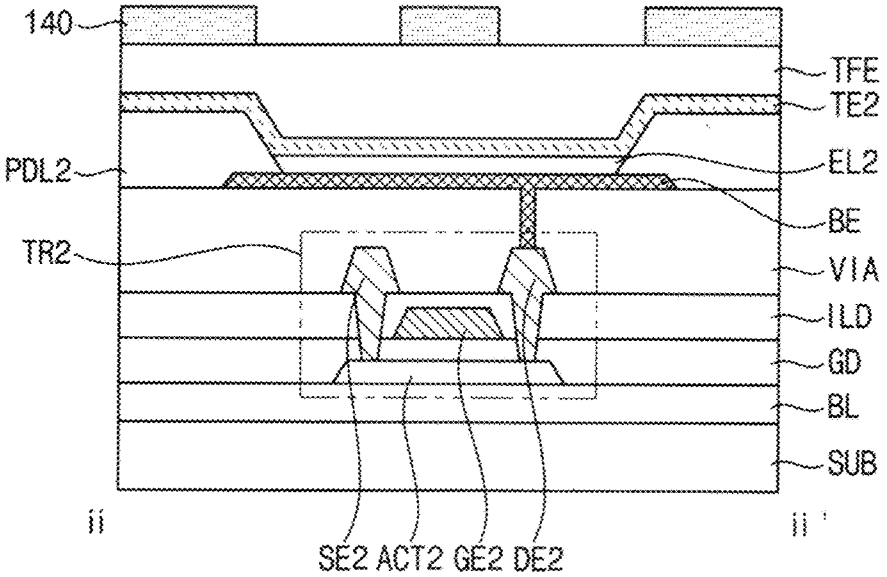
FIGS. 8 and 9 are sectional views of a sub-pixel of a private pixel taken along line ii-ii' of FIG. 7 according to embodiments of the invention.

FIG. 8 is a sectional view of a sub-pixel 121 of the private pixel 120 taken along line ii-ii' of the FIG. 7 according to an embodiment of the invention.

Referring to the FIG. 8, an embodiment of the display panel 100 may include the substrate SUB, the buffer layer BL, the gate insulating layer GD, the interlayer insulating layer ILD, a second transistor TR2, the via layer VIA, a second pixel defining layer PDL2, the lower electrode BE, a second emission layer EL2, a second upper electrode TE2, the encapsulation layer TFE, and the like. The second transistor TR2 may include a second active layer ACT2, a second gate electrode GE2, a second source electrode SE2, and second drain electrode DE2. The sectional view of the position of the green light emitting region 130*b* may be the same as the sectional view of the position of each of the red light emitting region 130*a* and the blue light emitting region 130*c*. The private pixel 120 may include the black matrix 140 on opposing sides of the encapsulation layer TFE and on the center of the encapsulation layer TFE. The black matrix 140 may include an organic light blocking material or an inorganic light blocking material including a black pigment or dye. The black matrix 140 may block light emitted from the second emission layer EL2 and directing to a side. In the private pixel 120, the light emitted from the second emission layer EL2 may be emitted at a relatively narrow angle due to the black matrix 140.

Figure 9:
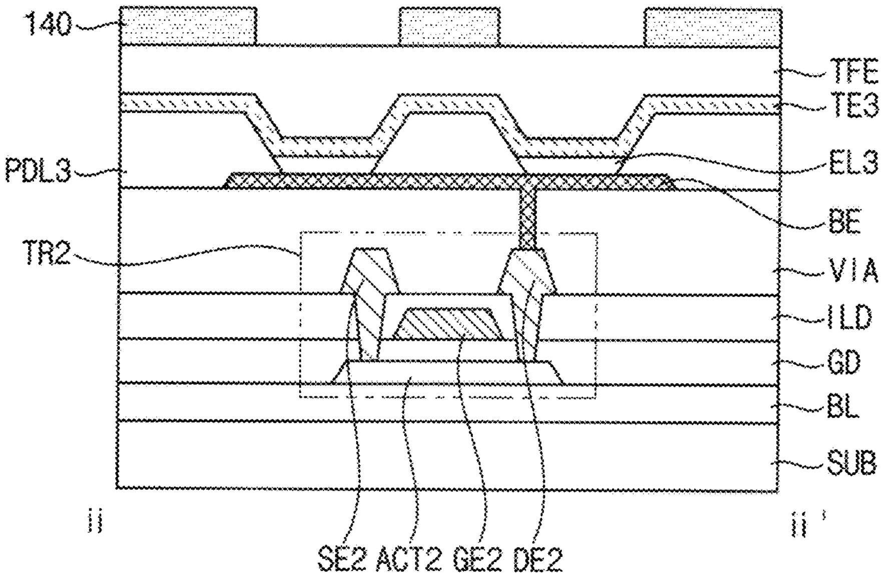

FIG. 9 is a sectional view of a sub-pixel 121 of the private pixel 120 taken along line ii-ii' of the FIG. 7 according to an alternative embodiment of the invention.

Referring to the FIG. 9, an embodiment of the display panel 100 may include the substrate SUB, the buffer layer BL, the gate insulating layer GD, the interlayer insulating layer ILD, the second transistor TR2, the via layer VIA, a third pixel defining layer PDL3, the lower electrode BE, a third emission layer EL3, a third upper electrode TE3, the encapsulation layer TFE, and the like. The second transistor TR2 may include the second active layer ACT2, the second gate electrode GE2, the second source electrode SE2, and the second drain electrode DE2. The sectional view of the position of the green light emitting region 130*b* may be the same as the sectional view of the position of each of the red light emitting region 130*a* and the blue light emitting region 130*c*. The private pixel 120 may include the black matrix 140 on opposing sides of the encapsulation layer TFE and on the center of the encapsulation layer TFE. The third pixel defining layer PDL3 may be placed (or disposed) between the third emission layers EL3. The third upper electrode TE3 may have a structure in which a center protrudes upward due to the third pixel defining layer PDL3. The structure of the third emission layers EL3 may block light emitted from the third emission layer EL3 and directing to the side more effectively than the structure of FIG. 8. The first pixel defining layer PDL1 and the third pixel defining layer PDL3 may be substantially the same as the second pixel defining layer PDL2 of FIG. 8 except for their arrangements.

Referring to the FIGS. 2 to 9, the first mode may be a normal mode in which a user looking at the display apparatus from a side perceive a normal image, and the second mode may be a private mode in which the user looking at the display apparatus from the side does not perceive the normal image. The first pixels 101 may be the normal pixels 110, and the second pixels 102 may be the private pixels 120. The private pixels 120 may block light directing to the side more effectively than the normal pixels 110. In the first part in which only the private pixel 120 is driven, the display apparatus may have a viewing angle narrower than each of a viewing angle in the normal mode and a viewing angle in the second part. The display apparatus may provide a display image with a relatively lower luminance to a user looking the display apparatus from the side than a user looking at the display apparatus from the front.

In an embodiment, the second part may be smaller than the first part. Accordingly, in the private mode, the private pixel 120 may be driven more than the normal pixel 110. Accordingly, a user of the display apparatus may not recognize a display image for the second part in the private mode. A lifetime of the private pixel 120 may be substantially improved compared to a case in which only the private pixel 120 is driven in the private mode. A difference in the deterioration degree between the private pixel 120 and the normal pixel 110 may be less than a case where only the private pixel 120 is driven in the private mode. Accordingly, in such an embodiment, color bleeding and afterimages generated due to the difference in the deterioration degree may be substantially reduced.

Figure 10:
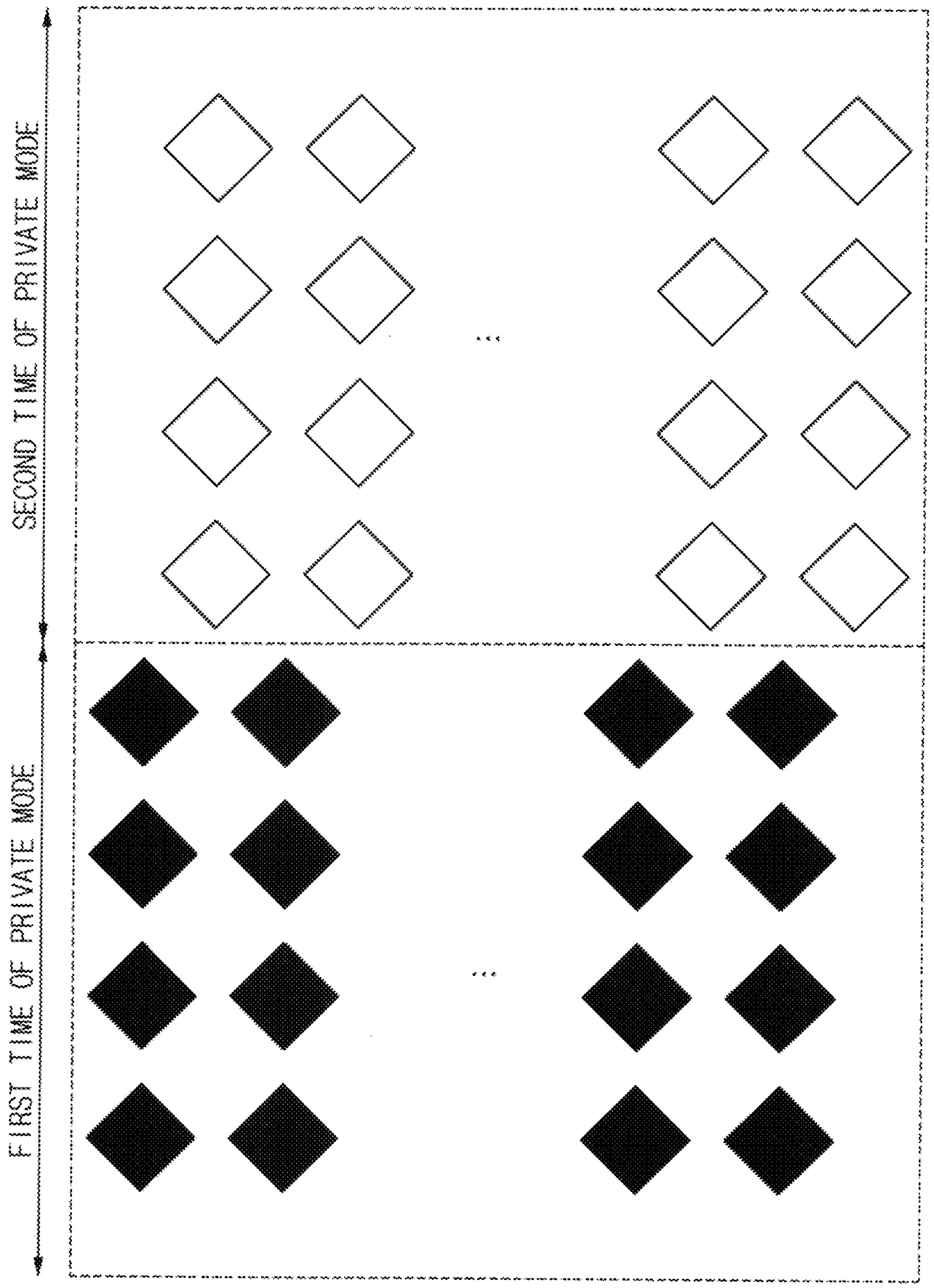
FIG. 10 is a diagram illustrating an embodiment in which first pixels and second pixels are driven in a second mode.

FIG. 10 is a diagram illustrating an embodiment in which the first pixels 101 and the second pixels 102 are driven in the second mode.

Referring to the FIG. 10, the display panel driver 600, in the first mode, may be drive both the first pixels 101 and the second pixels 102, and the display panel driver 600, in the second mode, may drive the second pixels 102 in a first time (e.g., a first period), and drive the first pixels 101 in a second time (e.g., a second period) which is after the first time. Driving of the display apparatus of FIGS. 3 and 4 may be substantially the same as driving of the display apparatus of FIG. 10, except for dividing the one frame into time.

The first time for driving the second pixels 102 and the second time for driving the first pixels 101 may be repeated alternately with each other in the second mode. The second time may be shorter than the first time. The second time may be shorter than a time during which a user perceives an image displayed by the first pixels 101.

The lifetime of the second pixels 102 may be substantially improved compared to a case in which only the second pixels 102 is driven in the private mode. A difference in the deterioration degree between the first pixels 101 and the second pixels 102 may be less than a case where only the second pixels 102 is driven in the private mode.

Figure 11:
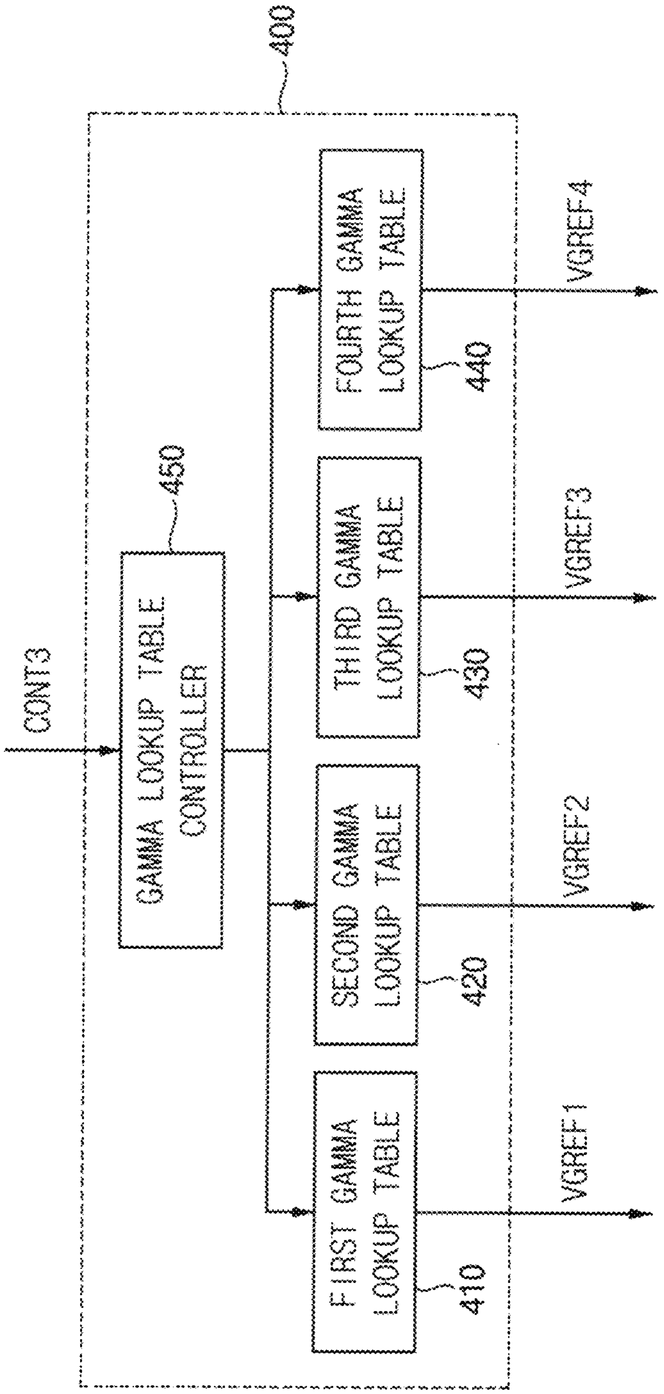
FIG. 11 is a block diagram illustrating an embodiment of a gamma reference voltage generator.

FIG. 11 is a block diagram illustrating an embodiment of a gamma reference voltage generator 400.

Referring to the FIG. 11, an embodiment of the gamma reference voltage generator 400 may generate a first gamma reference voltage VGREF1, a second gamma reference voltage VGREF2, a third gamma reference voltage VGREF3, and a fourth gamma reference voltage VGREF4. The gamma reference voltage generator 400 may include gamma lookup tables that generates the gamma reference voltage VGREF for each pixel. The data driver 500 may provide the data voltages DV to the first pixels 101 based on the first gamma reference voltage VGREF1 in the first mode, provide the data voltages DV to the second pixels 102 based on the second gamma reference voltage VGREF2 in the first mode, provide the data voltages DV to the first pixels 101 based on the third gamma reference voltage VGREF3 in the second mode, provide the data voltages DV to the second pixels 102 based on the fourth gamma reference voltage VGREF4 in the second mode. The gamma reference voltage generator 400 may include gamma lookup tables that generates the gamma reference voltage VGREF for each mode. The gamma reference voltage generator 400 may include a first gamma lookup table 410 for generating the first gamma reference voltage VGREF1 for the first pixels 101 in the first mode. The gamma reference voltage generator 400 may include a second gamma lookup table 420 for generating the second gamma reference voltage VGREF2 for the second pixels 102 in the first mode. The gamma reference voltage generator 400 may include a third gamma lookup table 430 for generating the third gamma reference voltage VGREF3 for the first pixels 101 in the second mode. The gamma reference voltage generator 400 may include a fourth gamma lookup table 440 for generating the fourth gamma reference voltage VGREF4 for the second pixels 102 in the second mode. The gamma reference voltage generator 400 may include a gamma lookup table controller 450. The gamma lookup table controller 450 may receive the third control signal CONT3 from the driving controller 200, control the first gamma lookup table 410, the second gamma lookup table 420, the third gamma lookup table 430, and the fourth gamma lookup table 440, and transmit the gamma reference voltage VGREF suitable for each mode and each pixel.

Since the first pixel 101 and the second pixel 102 may have different aperture ratios from each other, a luminance difference between the first pixel 101 and the second pixel 102 may occur under a same grayscale condition. Accordingly, by providing the gamma lookup table for each pixel, the luminance difference between the first pixel 101 and the second pixel 102 may be effectively adjusted. Since the first mode drives the first pixel 101 and the second pixel 102 at the same time and the second mode drives only the first pixel 101 or the second pixel 102 (e.g., since in the first mode, the first pixels 101 and the second pixels 102 in the first part for one frame and the first pixels 101 and the second pixels 102 in the second part for the one frame may be driven at the same time, and in the second mode, only the first pixels 101 in the first part for one frame and the second pixels 102 in the second part for the one frame may be driven at the same time), the luminance difference may occur under a same grayscale condition of the first mode and the second mode. Accordingly, by providing the gamma lookup table for each mode, the luminance difference between modes may be effectively adjusted. As a result, a flicker caused by the luminance difference of the display apparatus may be substantially reduced.

Figure 12:
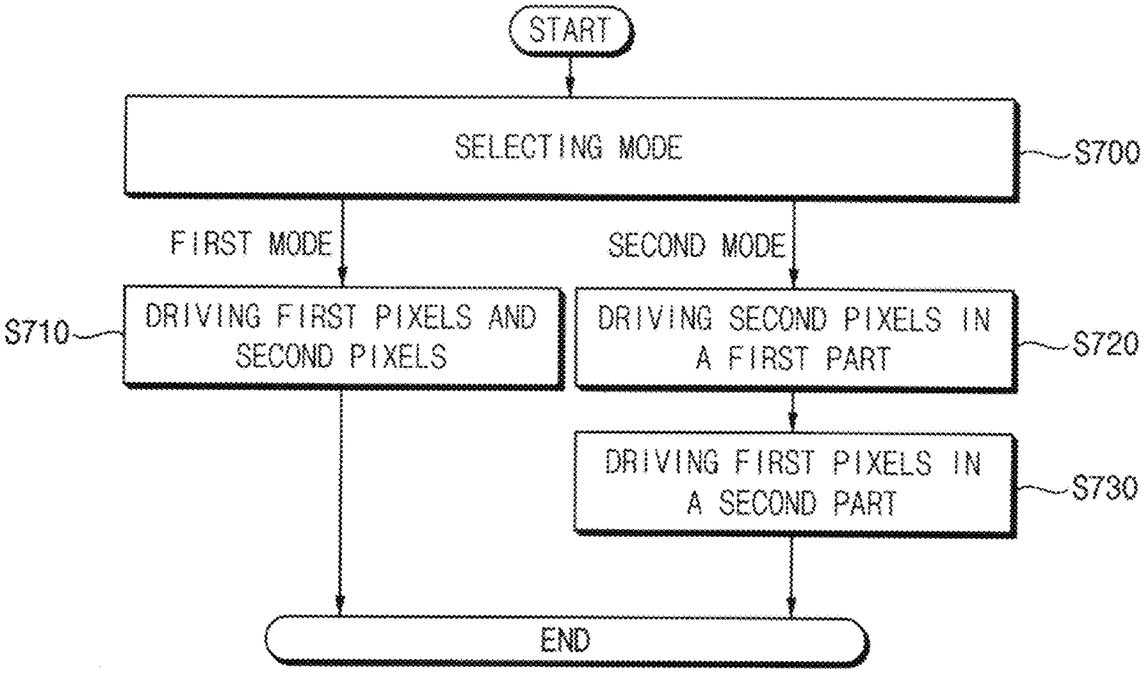
FIG. 12 is a flowchart illustrating a method of driving a display apparatus according to an embodiment of the invention.

FIG. 12 is a flowchart illustrating a method of driving a display apparatus according to embodiments of the invention.

Referring to the FIGS. 2, 4, and 12, an embodiment of the method of driving the display apparatus according to embodiments of the invention may include selecting a mode (S700). The display panel driver 600 may drive the first pixels 101 and the second pixels 102 in the first mode (S710). The display panel driver 600 may drive the second pixels 102 in the first part for one frame in the second mode (S720) (or the display panel driver 600 may drive the second pixels 102 in the first time of the one frame in the second mode). The display panel driver 600 may drive the first pixels 101 in the second part for the one frame in the second mode (S730) (or the display panel driver 600 may drive the first pixels 101 in the second time of the one frame in the second mode).

Figure 13:
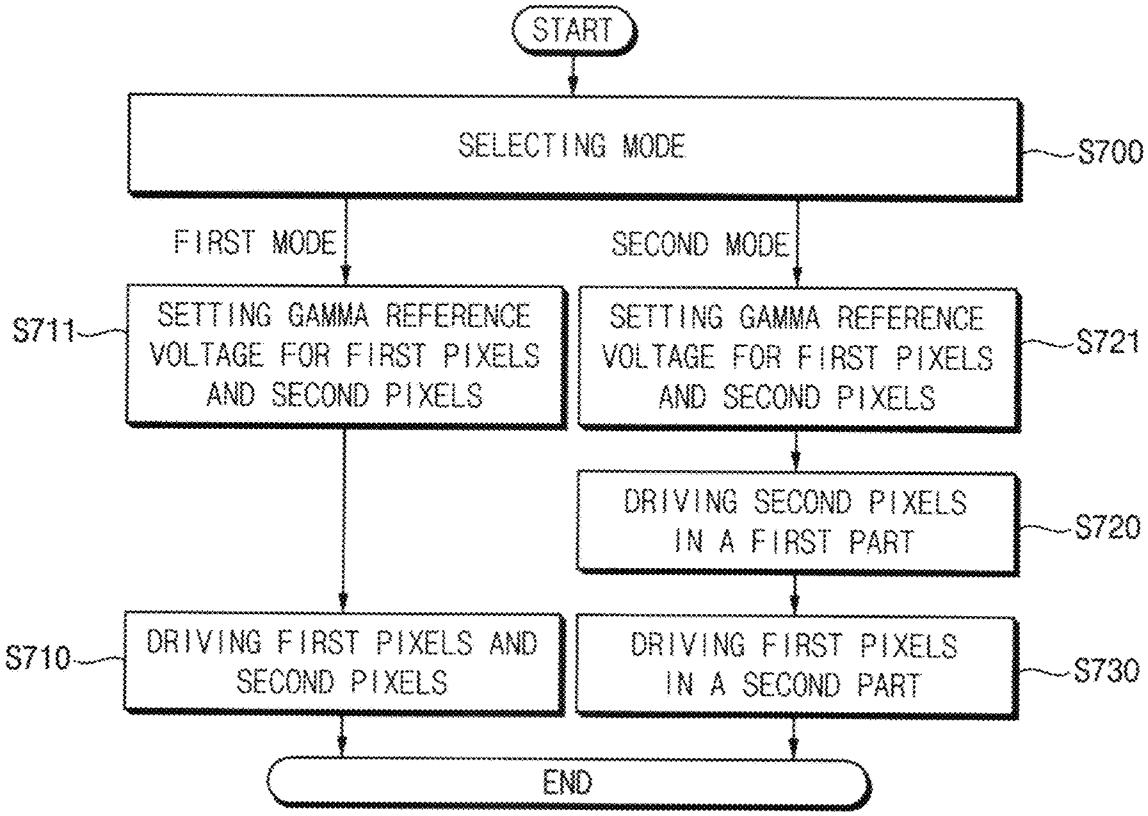
FIG. 13 is a flowchart illustrating a method of driving a display apparatus according to an alternative embodiment of the invention.

FIG. 13 is a flowchart illustrating a method of driving a display apparatus according to embodiments of the invention.

Referring to the FIG. 13, an embodiment of the method of driving the display apparatus according to embodiments of the invention may include selecting a mode (S700). The display panel driver 600 may set (or generate) a gamma reference voltage (e.g. the first gamma reference voltage VGREF1) for the first pixels 101 using (or based on) the first gamma lookup table 410 in the first mode, and set a gamma reference voltage (e.g. the second gamma reference voltage VGREF2) for the second pixels 102 using the second gamma lookup table 420 in the first mode (S711). The display panel driver 600 may drive the first pixels 101 and the second pixels 102 in the first mode (S710). The display panel driver 600 may set a gamma reference voltage (e.g. the third gamma reference voltage VGREF3) for the first pixels 101 using the third gamma lookup table 430 in the second mode, and set a gamma reference voltage (e.g. the fourth gamma reference voltage VGREF4) for the second pixels 102 using the fourth gamma lookup table 440 in the second mode (S721). The display panel driver 600 may drive the second pixels 102 in the first part for one frame in the second mode (S720). The display panel driver 600 may drive the first pixels 101 in the second part for the one frame in the second mode (S730).

By adjusting the gamma reference voltage VGREF, the flicker due to a luminance difference between pixels or between modes may be substantially reduced.

According to embodiments of the invention, by narrowing the viewing angle of the display apparatus in the second mode, only the user looking at the display apparatus from the front may recognize the normal image. The color bleeding and the afterimage may be reduced by minimizing the difference in the deterioration degree between the pixels due to the continuous driving of a specific pixel in all modes. In such embodiments, by driving the first pixels 101 during the second mode, the lifetime of the second pixels 102 may be substantially improved.

Embodiments of the invention may be applied any electronic device including the display apparatus. Such embodiments of the invention may be applied to a television ("TV"), a digital TV, a three-dimensional ("3D") TV, a mobile phone, a smart phone, a tablet computer, a virtual reality ("VR") device, a wearable electronic device, a personal computer ("PC"), a home appliance, a laptop computer, a personal digital assistant ("PDA"), a portable multimedia player (PMP), a digital camera, a music player, a portable game console, a navigation device, etc., for example.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display apparatus comprising:

a display panel including first pixels and second pixels; and a display panel driver which drives the display panel, wherein, in a first mode, the display panel driver drives both the first pixels and the second pixels, wherein, in a second mode, the display panel driver drives the second pixels in a first part for one frame, and drives the first pixels in a second part for the one frame, wherein each of the second pixels includes a plurality of sub-pixels, and wherein a light blocking material is disposed in the plurality of sub-pixels.

2. The display apparatus of claim 1, wherein the first part for the one frame corresponds to N−1 pixel rows of N pixel rows, wherein N is an integer greater than 1, and wherein the second part for the one frame corresponds to a remaining pixel row of the N pixel rows.

3. The display apparatus of claim 1, wherein the first mode is a normal mode in which a user looking at the display apparatus from a side perceives a normal image, and wherein the second mode is a private mode in which the user looking at the display apparatus from the side does not perceive the normal image.

4. The display apparatus of claim 1, wherein the first pixels are normal pixels, and wherein the second pixels are private pixels.

5. The display apparatus of claim 4, wherein each of the private pixels includes the plurality of sub-pixels, wherein each of the plurality of sub-pixels includes a plurality of light emitting regions, and wherein the light blocking material is disposed between the plurality of light emitting regions of each of the plurality of sub-pixels.

6. The display apparatus of claim 1, wherein the display panel driver comprises:

a gate driver which provides gate voltages to the display panel;

a gamma reference voltage generator which generates a first gamma reference voltage, a second gamma reference voltage, a third gamma reference voltage, and a fourth gamma reference voltage;

a data driver which provides data voltages to the first pixels based on the first gamma reference voltage in the first mode, provides the data voltages to the second pixels based on the second gamma reference voltage in the first mode, provides the data voltages to the first pixels based on the third gamma reference voltage in the second mode, and provides the data voltages to the second pixels based on the fourth gamma reference voltage in the second mode; and a driver controller which controls the gate driver, the gamma reference voltage generator, and the data driver.

7. The display apparatus of claim 6, wherein the gamma reference voltage generator comprises:

a first gamma lookup table corresponding to the first gamma reference voltage for the first pixels in the first mode;

a second gamma lookup table corresponding to the second gamma reference voltage for the second pixels in the first mode;

a third gamma lookup table corresponding to the third gamma reference voltage for the first pixels in the second mode; and a fourth gamma lookup table corresponding to the fourth gamma reference voltage for the second pixels in the second mode.

8. A display apparatus comprising:

a display panel including first pixels and second pixels; and a display panel driver which drives the display panel, wherein, in a first mode, the display panel driver drives both the first pixels and the second pixels, wherein, in a second mode, the display panel driver drives the second pixels in a first time, and drives the first pixels in a second time after the first time, wherein each of the second pixels includes a plurality of sub-pixels, and wherein a light blocking material is disposed in the plurality of sub-pixels.

9. The display apparatus of claim 8, wherein the first time for driving the second pixels and the second time for driving the first pixels are repeated alternately with each other in the second mode.

10. The display apparatus of claim 9, wherein the second time is shorter than the first time.

11. The display apparatus of claim 10, wherein the second time is shorter than a time during which a user perceives an image displayed by the first pixels.

12. The display apparatus of claim 8, wherein the first pixels are normal pixels, and wherein the second pixels are private pixels.

13. The display apparatus of claim 12, wherein each of the private pixels includes the plurality of sub-pixels, wherein each of the plurality of sub-pixels includes a plurality of light emitting regions, and wherein the light blocking material is disposed between the plurality of light emitting regions of each of the plurality of sub-pixels.

14. The display apparatus of claim 8, wherein the display panel driver comprises:

a gate driver which provides gate voltages to the display panel;

a gamma reference voltage generator which generates a first gamma reference voltage, a second gamma reference voltage, a third gamma reference voltage, and a fourth gamma reference voltage;

a data driver which provides data voltages to the first pixels based on the first gamma reference voltage in the first mode, provides the data voltages to the second pixels based on the second gamma reference voltage in the first mode, provides the data voltages to the first pixels based on the third gamma reference voltage in the second mode, and provides the data voltages to the second pixels based on the fourth gamma reference voltage in the second mode; and a driver controller which controls the gate driver, the gamma reference voltage generator, and the data driver.

15. The display apparatus of claim 14, wherein the gamma reference voltage generator comprises:

a first gamma lookup table corresponding to the first gamma reference voltage for the first pixels in the first mode;

a second gamma lookup table corresponding to the second gamma reference voltage for the second pixels in the first mode;

a third gamma lookup table corresponding to the third gamma reference voltage for the first pixels in the second mode; and a fourth gamma lookup table corresponding to the fourth gamma reference voltage for the second pixels in the second mode.

16. A method of driving a display apparatus, the method comprising:

driving first pixels and second pixels of the display apparatus in a first mode;

driving the second pixels in a first part of one frame;

driving the first pixels in a second part of the one frame, wherein each of the second pixels includes a plurality of sub-pixels, and wherein a light blocking material is disposed in the plurality of sub-pixels.

17. The method of claim 16, wherein the first part of the one frame corresponds to N−1 pixel rows of N pixel rows, wherein N is an integer greater than 1, and wherein the second part of the one frame corresponds to a remaining pixel row of the N pixel rows.

18. The method of claim 16, wherein the first pixels are normal pixels, and wherein the second pixels are private pixels.

19. The method of claim 18, wherein each of the private pixels includes the plurality of sub-pixels, wherein each of the plurality of sub-pixels includes a plurality of light emitting regions, and wherein the light blocking material is disposed between the plurality of light emitting regions of each of the plurality of sub-pixels.

20. The method of claim 16, the method further comprising:

setting a first gamma reference voltage for the first pixels using a first gamma lookup table in the first mode;

setting a second gamma reference voltage for the second pixels using a second gamma lookup table in the first mode;

setting a third gamma reference voltage for the first pixels using a third gamma lookup table in the second mode; and setting a fourth gamma reference voltage for the second pixels using a fourth gamma lookup table in the second mode.

* * * * *